US012755422B2

(12) United States Patent
Kato et al.

(10) Patent No.: US 12,755,422 B2
(45) Date of Patent: Oct. 6, 2026

(54) INFORMATION PROCESSING APPARATUS, INFORMATION PROCESSING SYSTEM, INFORMATION PROCESSING METHOD, AND PROGRAM

(71) Applicant: Sony Group Corporation, Tokyo (JP)

(72) Inventors: Takaaki Kato, Kanagawa (JP); Tatsuki Kashitani, Tokyo (JP); Masaya Kaneko, Chiba (JP); Takashi Konno, Chiba (JP); Yuki Ono, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 219 days.

(21) Appl. No.: 18/703,927

(22) PCT Filed: Aug. 12, 2022

(86) PCT No.: PCT/JP2022/030715
§ 371 (c)(1),
(2) Date: Apr. 23, 2024

(87) PCT Pub. No.: WO2023/095392
PCT Pub. Date: Jun. 1, 2023

(65) Prior Publication Data

US 2024/0420366 A1 Dec. 19, 2024

(30) Foreign Application Priority Data

Nov. 24, 2021 (JP) ................................ 2021-190451

(51) Int. Cl.
*G06T 7/73* (2017.01)

(52) U.S. Cl.
CPC ...... *G06T 7/73* (2017.01); *G06T 2207/30204* (2013.01); *G06T 2207/30244* (2013.01)

(58) Field of Classification Search
CPC ............. G06T 7/73; G06T 2207/30204; G06T 2207/30244
(Continued)

(56) References Cited

U.S. PATENT DOCUMENTS

| | | | | |
|---|---|---|---|---|
| 6,556,722 | B1 | 4/2003 | Russell | |
| 2007/0248283 | A1 * | 10/2007 | Mack ..................... | H04N 5/222 348/E5.022 |

(Continued)

FOREIGN PATENT DOCUMENTS

| | | | |
|---|---|---|---|
| JP | 2006-267026 | A | 10/2006 |
| JP | 2013-130911 | A | 7/2013 |
| KR | 102090533 | B1 | 3/2020 |

OTHER PUBLICATIONS

Yamatsuka, Production examples with virtual technologies in CyberHuman Productions, Inc.—Shooting technique and developments of LED Studio and FutureLive-, ITE Technical Report, Nov. 29, 2021, pp. 13-16, vol. 45, No. 37.

(Continued)

*Primary Examiner* — Jin Ge
(74) *Attorney, Agent, or Firm* — Paratus Law Group, PLLC

(57) ABSTRACT

There is provided an information processing apparatus to more easily estimate a position and a posture of an imaging camera. The information processing apparatus includes: a position estimation unit configured to estimate a position and a posture of an imaging camera configured to image an image displayed on a display device as a background by using a plurality of markers existing on a display surface of the display device; and a marker control unit configured to control display or non-display of each of the markers on the basis of a viewing angle of the imaging camera determined from the position and the posture of the imaging camera.

22 Claims, 7 Drawing Sheets

(58) Field of Classification Search
USPC .......................................................... 345/619
See application file for complete search history.

(56) References Cited

U.S. PATENT DOCUMENTS

| | | | | |
|---|---|---|---|---|
| 2015/0350628 | A1* | 12/2015 | Sanders | G06F 3/011 345/419 |
| 2018/0070019 | A1 | 3/2018 | Laurent | |
| 2018/0101964 | A1* | 4/2018 | Lee | G06T 7/70 |
| 2020/0143592 | A1* | 5/2020 | Cordes | G06T 15/50 |

OTHER PUBLICATIONS

David Scherfgen: "Camera-Based 3D Pointing Approach Using Dynamic On-Screen Markers" In: "Camera-Based 3D Pointing Approach Using Dynamic On-Screen Markers", Jun. 15, 2015 (Jun. 15, 2015), XP055368421, pp. 1-145.

* cited by examiner

INFORMATION PROCESSING APPARATUS, INFORMATION PROCESSING SYSTEM, INFORMATION PROCESSING METHOD, AND PROGRAM

CROSS REFERENCE TO PRIOR APPLICATION

This application is a National Stage Patent Application of PCT International Patent Application No. PCT/JP2022/030715 (filed on Aug. 12, 2022) under 35 U.S.C. § 371, which claims priority to Japanese Patent Application No. 2021-190451 (filed on Nov. 24, 2021), which are all hereby incorporated by reference in their entirety.

TECHNICAL FIELD

The present disclosure relates to an information processing apparatus, an information processing system, an information processing method, and a program.

BACKGROUND ART

In recent video production, adoption of a so-called in-camera VFX that images visual effects simultaneously with imaging of a performance by a performer has been studied.

In the in-camera VFX, an image of a virtual three-dimensional space is displayed on a display device arranged in a wall shape so as to surround the performer, whereby the performer in a foreground and an image of a background displayed on the display device can be seamlessly integrated. According to this, the in-camera VFX can add a visual effect to the image of the virtual three-dimensional space displayed on the display device.

In the in-camera VFX described above, in a case where an imaging camera moves in a scene, an image displayed on the display device within a viewing angle of the imaging camera is controlled following the movement of the imaging camera. Specifically, the display device is controlled such that the image visually recognized by the imaging camera in the virtual three-dimensional space is always displayed within the viewing angle of the imaging camera. As a result, the imaging camera can image a video as if imaging is performed at a place in the real world by the parallax effect. Therefore, in the in-camera VFX, it is important to track the position and the posture of the imaging camera and display an image corresponding to the viewpoint of the imaging camera on the display device.

For example, Patent Document 1 below discloses a technique of self-position estimation in a mobile body. According to the technology disclosed in Patent Document 1, the self-position of the mobile body can be estimated on the basis of a relative position of the mobile body with respect to the display device and position information of the display device on map information.

CITATION LIST

Patent Document

Patent Document 1: Japanese Patent Application Laid-Open No. 2013-130911

SUMMARY OF THE INVENTION

Problems to be Solved by the Invention

On the other hand, in the in-camera VFX, a large number of physical markers are installed in an imaging environment, and the installed physical markers are detected by a tracking camera mounted on the imaging camera, thereby estimating the position and the posture of the imaging camera. However, since it takes a lot of time and effort to install a large number of physical markers in the imaging environment, the imaging time by the in-camera VFX is extended and the imaging cost is increased.

Therefore, the present disclosure proposes a new and improved information processing apparatus, information processing system, information processing method, and program that enable easier estimation of the position and the posture of the imaging camera.

Solutions to Problems

According to the present disclosure, there is provided an information processing apparatus including: a position estimation unit configured to estimate a position and a posture of an imaging camera configured to image an image displayed on a display device as a background by using a plurality of markers existing on a display surface of the display device; and a marker control unit configured to control display or non-display of each of the markers on the basis of a viewing angle of the imaging camera determined from the position and the posture of the imaging camera.

Furthermore, according to the present disclosure, there is provided an information processing method including: by an arithmetic processing device, estimating a position and a posture of an imaging camera configured to image an image displayed on a display device as a background by using a plurality of markers existing on a display surface of the display device; and controlling display or non-display of each of the markers on the basis of a viewing angle of the imaging camera determined from the position and the posture of the imaging camera.

Furthermore, according to the present disclosure, there is provided a program configured to cause a computer to function as: a position estimation unit configured to estimate a position and a posture of an imaging camera configured to image an image displayed on a display device as a background by using a plurality of markers existing on a display surface of the display device; and a marker control unit configured to control display or non-display of each of the markers on the basis of a viewing angle of the imaging camera determined from the position and the posture of the imaging camera.

MODE FOR CARRYING OUT THE INVENTION

Figure 1:
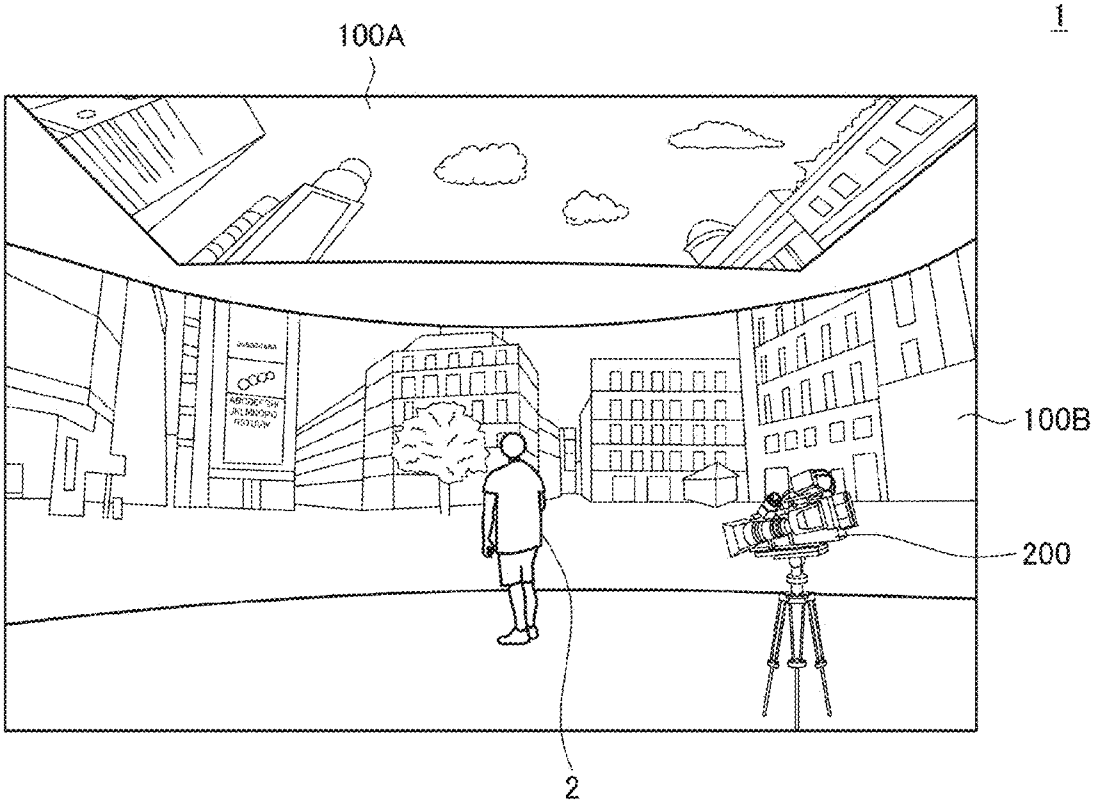
FIG. 1 is an explanatory diagram schematically illustrating an information processing system according to an embodiment of the present disclosure.

Hereinafter, a preferred embodiment of the present disclosure will be described in detail with reference to the accompanying drawings. Note that, in the present specification and drawings, components having substantially the same functional configuration are denoted by the same reference numerals to avoid the description from being redundant.

Note that the description will be given in the following order.

1. Information processing system
1.1. Overall configuration of information processing system
1.2. Configuration of information processing apparatus
2. Operation example
3. Modifications
3.1. First modification
3.2. Second modification
3.3. Third modification
3.4. Fourth modification
3.5. Fifth modification
4. Hardware

1. Information Processing System

1.1. Overall Configuration of Information Processing System

Figure 2:
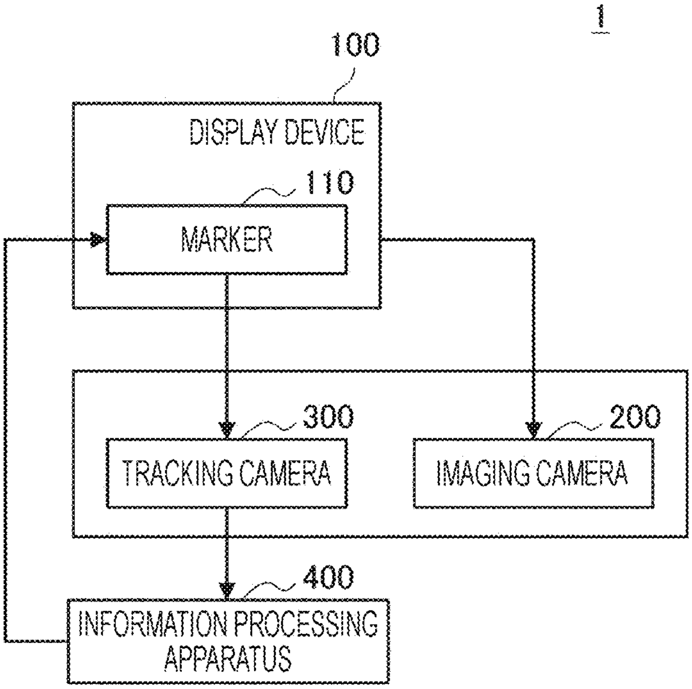
FIG. 2 is a block diagram illustrating an overall configuration of the information processing system according to the embodiment.

An overall configuration of an information processing system according to an embodiment of the present disclosure will be described with reference to FIGS. 1 and 2. FIG. 1 is an explanatory diagram schematically illustrating an information processing system 1 according to the present embodiment. FIG. 2 is a block diagram illustrating an overall configuration of the information processing system 1 according to the present embodiment.

As illustrated in FIG. 1, the information processing system 1 according to the present embodiment includes, for example, a display device 100A, a display device 100B, and an imaging camera 200. The information processing system 1 is an imaging system that images a performance of a performer 2 with the imaging camera 200 using images displayed on the display devices 100A and 100B as backgrounds. The information processing system 1 can realize a so-called in-camera VFX by adding computer graphics or the like to the images displayed on the display devices 100A and 100B.

Specifically, the display device 100A is provided on a ceiling that covers a space where the performer 2 exists, and the display device 100B is provided on a wall surface that surrounds the space where the performer 2 exists in an arc shape. As a result, the display devices 100A and 100B can display an image of a virtual three-dimensional space as a background of a scene performed by the performer 2 and can provide ambient light of the three-dimensional space. Note that, hereinafter, the display devices 100A and 100B are also collectively referred to as a display device 100.

The display device 100 may be, for example, an LED display device in which each pixel is configured by a light emitting diode (LED). In a case where the display device 100 is an LED display device capable of displaying a high resolution and high quality image, the display device 100 can further enhance the immersive feeling and the realistic feeling of the video imaged by the imaging camera 200.

The imaging camera 200 images a video of a scene performed by the performer 2. Specifically, the imaging camera 200 images the performance of the performer 2 in the foreground with the image displayed on the display device 100B as the background. As a result, the imaging camera 200 can image a video as if the performer 2 is performing a performance in a virtual three-dimensional space of the background image displayed on the display device 100.

Here, in a case where the imaging camera 200 moves in the scene, the background image displayed on the display device 100 within the viewing angle of the imaging camera 200 is controlled following the movement of the viewpoint of the imaging camera 200. Specifically, the background image displayed on the display device 100 within the viewing angle of the imaging camera 200 is controlled to be an image visually recognized by the imaging camera 200 in a case where the imaging camera 200 moves in a virtual three-dimensional space by the background image. Since the parallax effect is generated by such control, the video imaged by the imaging camera 200 can give an impression as if imaged in a virtual three-dimensional space by the background image displayed on the display device 100. For example, a background image serving as the background of the scene and dynamically controlled following the viewpoint movement of the imaging camera 200 may be displayed on the display device 100B within the viewing angle of the imaging camera 200. On the other hand, a fixed viewpoint image that provides ambient light of a three-dimensional space may be displayed on the display device 100A outside the viewing angle of the imaging camera 200.

In order to realize the above control, in the information processing system 1, it is important to estimate the position and the posture of the imaging camera 200 with respect to the display device 100. Specifically, as illustrated in FIG. 2, the information processing system 1 can estimate the position and the posture of the imaging camera 200 by detecting a marker 110 existing on the display surface of the display device 100 with a tracking camera 300 integrated with the imaging camera 200.

A plurality of markers 110 is provided on the display surface of the display device 100. The marker 110 may be provided on the display device 100B on which the background image following the viewpoint movement of the imaging camera 200 is displayed, or may be provided on the display device 100A on which the fixed viewpoint image that provides the ambient light of the three-dimensional space is displayed. As an example, the marker 110 may be provided as an image in an image displayed on the display surface of the display device 100. More particularly, the marker 110 may be provided as an image of a mark, texture, or a two-dimensional code (for example, a QR code (registered trademark)). Such an image that functions as the marker 110 is also referred to as a digital marker. As another example, the marker 110 may be provided as a pixel on the display surface of the display device 100. More specifically, the marker 110 may be provided on the display surface of the display device 100 as a pixel that emits infrared rays (InfraRed: IR).

The tracking camera 300 is a capturing device capable of detecting the marker 110, and is provided integrally with the imaging camera 200. Note that the viewing angle of the tracking camera 300 may be different from the viewing angle of the imaging camera 200. In such a case, the tracking camera 300 can efficiently capture an image of the marker 110 outside the viewing angle of the imaging camera 200.

The information processing apparatus 400 estimates the positions and the postures of the tracking camera 300 and the imaging camera 200 on the basis of the detection result of the marker 110 by the tracking camera 300. Specifically, the information processing apparatus 400 can estimate the positions and the postures of the tracking camera 300 and the imaging camera 200 on the basis of the three-dimensional position of the marker 110 and the two-dimensional position of the marker 110 captured by the tracking camera 300.

Furthermore, the information processing apparatus 400 can move the background image displayed on the display device 100 within the viewing angle of the imaging camera 200 following the position and the posture of the imaging camera 200 on the basis of the estimated position and posture of the imaging camera 200.

In the information processing system 1 according to the present embodiment, the information processing apparatus 400 further controls display or non-display of the marker 110 on the basis of the viewing angle of the imaging camera 200. Specifically, the information processing apparatus 400 controls display or non-display of the marker 110 such that the marker 110 within the viewing angle of the imaging camera 200 is not displayed and the marker 110 outside the viewing angle of the imaging camera 200 is displayed. According to this, the information processing apparatus 400 can prevent the marker 110 embedded in the display device 100 from being reflected in the imaging camera 200. Details of the control by the information processing apparatus 400 will be described later.

The information processing system 1 having the above configuration can more easily install the marker 110 by providing the marker 110 as an image or a pixel in the display device 100 without installing a large number of physical markers on the wall or the ceiling of the imaging environment. According to this, the information processing system 1 can estimate the position and the posture of the imaging camera 200 using the marker 110 that is more easily installed. In addition, since the information processing system 1 can control display or non-display of the marker 110 existing on the display surface of the display device 100 on the basis of the viewing angle of the imaging camera 200, it is possible to prevent the marker 110 from being reflected in the captured image of the imaging camera 200.

1.2. Configuration of Information Processing Apparatus

Figure 3:
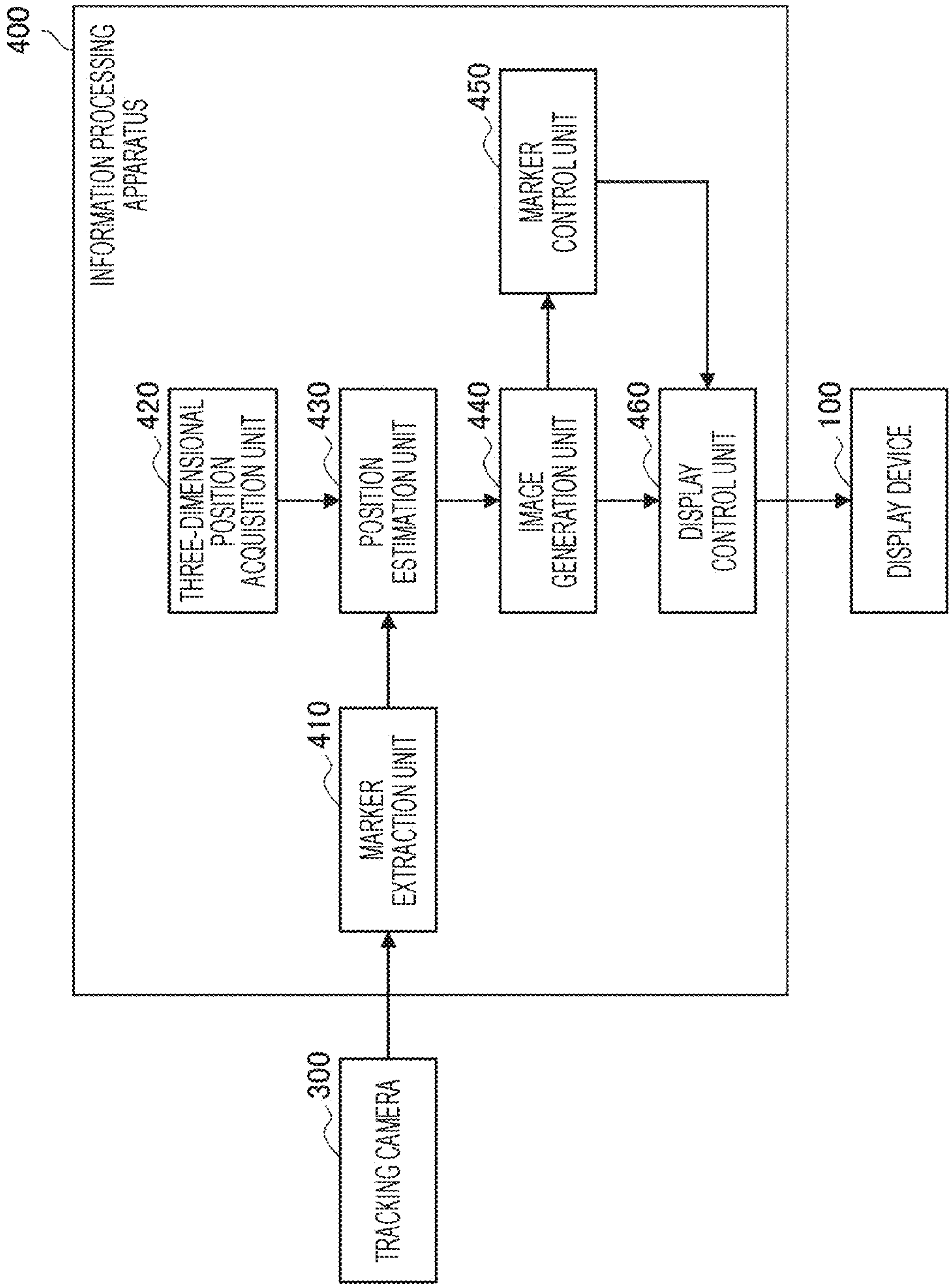
FIG. 3 is a block diagram illustrating a functional configuration of an information processing apparatus according to the embodiment.

A functional configuration of the information processing apparatus 400 included in the information processing system 1 according to the present embodiment will be described with reference to FIG. 3. FIG. 3 is a block diagram illustrating the functional configuration of the information processing apparatus 400.

As illustrated in FIG. 3, the information processing apparatus 400 includes a marker extraction unit 410, a three-dimensional position acquisition unit 420, a position estimation unit 430, an image generation unit 440, a marker control unit 450, and a display control unit 460.

The marker extraction unit 410 extracts the marker 110 from the image captured by the tracking camera 300. For example, in a case where the marker 110 is an image embedded in a background image displayed on the display device 100, the marker extraction unit 410 may extract the marker 110, which is an image of a unique mark, texture, or a two-dimensional code, from a captured image by image recognition. Furthermore, in a case where the marker 110 is an IR pixel embedded in the display surface of the display device 100, the marker extraction unit 410 may extract the marker 110, which is a bright spot of IR light, from the captured image. As a result, the marker extraction unit 410 can derive the two-dimensional position of the marker 110 on the image captured by the tracking camera 300.

As illustrated in FIG. 1, the marker 110 may be provided on a display surface of the display device 100B arranged on a wall surface surrounding a space where the performer 2 exists in an arc shape, or may be provided on a display surface of the display device 100A arranged on a ceiling covering the space where the performer 2 exists. In a case where a plurality of display devices 100 exists, in order to more reliably prevent the marker 110 from being reflected in the captured image of the imaging camera 200, the marker 110 may be provided on a display surface of the display device 100 that displays a fixed viewpoint image that provides ambient light of a three-dimensional space. For example, the marker 110 may be provided on a display surface of the display device 100A arranged on a ceiling to display a fixed viewpoint image that provides ambient light in a three-dimensional space. Since the fixed viewpoint image displayed on the display device 100A arranged on the ceiling is not captured by the imaging camera 200, the information processing system 1 can reliably prevent the marker 110 from being reflected in the captured image of the imaging camera 200.

The three-dimensional position acquisition unit 420 acquires the three-dimensional position of the marker 110. As an example, the three-dimensional position acquisition unit 420 may acquire the three-dimensional position of the marker 110 stored in advance in a storage unit or the like, or may acquire the three-dimensional position of the marker 110 from the display device 100. As another example, the three-dimensional position acquisition unit 420 may derive the three-dimensional position of the marker 110 on the basis of the shape of the display surface of the display device 100 and the two-dimensional display position of the marker 110 on the display device 100. Furthermore, the three-dimensional position acquisition unit 420 may derive the three-dimensional position of the marker 110 on the basis of the depth information from the tracking camera 300 to the display device 100 and the image captured by the tracking camera 300.

The position estimation unit 430 estimates the position and the posture of the imaging camera 200 on the basis of the two-dimensional position of the marker 110 derived by the marker extraction unit 410 and the three-dimensional position of the marker 110 acquired by the three-dimensional position acquisition unit 420. Specifically, the position estimation unit 430 first determines a correspondence relationship between the three-dimensional position of the marker 110 and the two-dimensional position of the marker 110 derived by the marker extraction unit 410. Next, the position estimation unit 430 estimates the position and the orientation at which the marker 110 existing at the three-dimensional position is visually recognized at the two-dimensional position derived by the marker extraction unit 410, thereby estimating the position and the posture of the tracking camera 300. Subsequently, the position estimation unit 430 can estimate the position and the posture of the imaging camera 200 by adjusting offsets in position and posture between the tracking camera 300 and the imaging camera 200 with respect to the estimated position and posture of the tracking camera 300.

The position estimation unit 430 can determine the correspondence relationship between the three-dimensional position of the marker 110 and the two-dimensional position of the marker 110 by using the distribution of the markers 110. For example, in a case where the markers 110 exist in an aperiodic distribution on the display surface of the display device 100, the position estimation unit 430 can determine the correspondence relationship between the two-dimensional position and the three-dimensional position of the marker 110 by associating the patterns of the unique distribution of the markers 110 with each other. On the other hand, in a case where the markers 110 exist in a periodic distribution such as a square lattice on the display surface of the display device 100, it is difficult to identify each of the markers 110 unless each of the markers 110 is a unique two-dimensional code or the like. In such a case, it is difficult to determine the correspondence relationship between the two-dimensional position and the three-dimensional position of the marker 110, which is not preferable.

The image generation unit 440 generates a virtual three-dimensional space as a base of an image displayed on the display device 100. Specifically, the image generation unit 440 may generate a virtual three-dimensional space using computer graphics.

The image displayed on the display device 100 is an image from one viewpoint of the virtual three-dimensional space generated by the image generation unit 440. For example, the image displayed on the display device 100 (for example, the display device 100B) within the viewing angle of the imaging camera 200 and serving as the background of the scene to be imaged may be an image showing a virtual three-dimensional space from a viewpoint corresponding to the position and the posture of the imaging camera 200. Furthermore, the image that is displayed on the display device 100 (for example, the display device 100A) outside the viewing angle of the imaging camera 200 and provides ambient light of the scene to be imaged may be an image showing a virtual three-dimensional space from a fixed viewpoint corresponding to the scene.

Furthermore, the image generation unit 440 may generate the marker 110 to be embedded as an image in the image displayed on the display device 100. As described above, the marker 110 embedded as an image in the image is an image of a unique mark, texture, or a two-dimensional code. The image generation unit 440 may embed the marker 110 in the generated virtual three-dimensional space.

For example, the position and the posture of the imaging camera 200 derived from the marker 110 positioned on the display surface of the display device 100 are estimated as the position and the posture with respect to the display surface of the display device 100. In such a case, the position and the posture of the imaging camera 200 are aligned with respect to the display device 100. Therefore, in order to generate an image of a virtual three-dimensional space from a viewpoint corresponding to the position and the posture of the imaging camera 200, it is further necessary to align the virtual three-dimensional space with the display device 100 or the imaging camera 200.

On the other hand, the position and the posture of the imaging camera 200 derived from the marker 110 embedded in the virtual three-dimensional space are estimated as the position and the posture with respect to the virtual three-dimensional space. In such a case, the position and the posture of the imaging camera 200 are aligned with respect to the virtual three-dimensional space. Therefore, the image generation unit 440 can generate an image of a virtual three-dimensional space from a viewpoint corresponding to the position and the posture of the imaging camera 200 without performing additional alignment. Therefore, in a case where the marker 110 is embedded in the virtual three-dimensional space, it is possible to more easily generate an image of the virtual three-dimensional space from a viewpoint corresponding to the position and the posture of the imaging camera 200.

Further, as described above, in order to more easily determine the correspondence relationship between the three-dimensional position of the marker 110 and the two-dimensional position of the marker 110, the markers 110 may be arranged in an aperiodic distribution such that distribution patterns are unique.

Note that, in a case where the marker 110 is provided as a pixel on the display surface of the display device 100, it goes without saying that the image generation unit 440 does not generate an image of the marker 110.

The marker control unit 450 controls display or non-display of the marker 110 on the basis of the viewing angle of the imaging camera 200. Specifically, the marker control unit 450 performs control such that the marker 110 within the viewing angle of the imaging camera 200 estimated on the basis of the position and the posture of the imaging camera 200 is not displayed, and performs control such that the marker 110 outside the viewing angle of the imaging camera 200 is displayed. According to this, the marker control unit 450 can prevent the marker 110 embedded in the display device 100 from entering the viewing angle of the imaging camera 200 and being reflected in the imaged image.

On the other hand, since the tracking camera 300 has a viewing angle different from that of the imaging camera 200, the marker 110 included outside the viewing angle of the imaging camera 200 can be more efficiently captured.

Furthermore, the marker control unit 450 may further control the size, hue, distribution, or the like of the marker 110.

As an example, the marker control unit 450 may control the size of the marker 110 on the basis of the distance from the tracking camera 300 to the marker 110. For example, the marker control unit 450 may control the size of the marker 110 such that the marker 110 becomes larger as the distance from the tracking camera 300 to the marker 110 becomes longer. According to this, the marker control unit 450 can suppress a decrease in the visibility of the marker 110 having a long distance from the tracking camera 300.

As another example, the marker control unit 450 may control the hue of the marker 110 on the basis of the hue of the image of the virtual three-dimensional space generated by the image generation unit 440. For example, the marker control unit 450 may control the hue of the marker 110 for each scene such that the hue of the image in which the marker 110 exists is similar to the hue of the marker 110. According to this, the marker control unit 450 can suppress the possibility that the marker 110 affects the hue of the ambient light of the scene to be imaged.

Furthermore, the marker control unit 450 may control the distribution of the markers 110 on the basis of the curvature of the display surface of the display device 100. For example, the marker control unit 450 may control the distribution of the markers 110 for each display device 100 such that the density of the distribution of the markers 110 increases as the curvature of the display surface of the display device 100 becomes higher and the shape becomes more complicated. Accordingly, the marker control unit 450 can suppress a decrease in the detection accuracy of the marker 110 due to the shape of the display surface of the display device 100.

The display control unit 460 controls the overall image displayed on the display device 100.

Specifically, the display control unit 460 controls an image displayed on the display device 100 within the viewing angle of the imaging camera 200. For example, the display control unit 460 may cause the display device 100 within the viewing angle of the imaging camera 200 to display an image reproducing the viewpoint of the imaging camera 200 in the virtual three-dimensional space following the position and the posture of the imaging camera 200. According to this, the display control unit 460 can cause the display device 100 to display an image as if the imaging camera 200 is imaging in a virtual three-dimensional space by controlling the image displayed on the display device 100 in accordance with the change in the position and the posture of the imaging camera 200.

Furthermore, the display control unit 460 controls an image displayed on the display device 100 outside the viewing angle of the imaging camera 200. For example, the display control unit 460 may cause the display device 100 outside the viewing angle of the imaging camera 200 to display the image of the fixed viewpoint of the virtual three-dimensional space. According to this, the display control unit 460 can provide the ambient light of the virtual three-dimensional space to the scene imaged by the imaging camera 200 by the image displayed on the display device 100 outside the viewing angle of the imaging camera 200.

As a result, in the display device 100 within the viewing angle of the imaging camera 200, the marker 110 is controlled to be non-displayed, and an image of a virtual three-dimensional space following the position and the posture of the imaging camera 200 can be displayed. Furthermore, the display device 100 outside the viewing angle of the imaging camera 200 is controlled such that the marker 110 is displayed, and can display an image of a virtual three-dimensional space of a fixed viewpoint.

According to the above configuration, the information processing apparatus 400 can control display or non-display of the marker 110 existing on the display surface of the display device 100 on the basis of the viewing angle of the imaging camera 200 estimated from the position and the posture of the imaging camera 200. Therefore, the information processing apparatus 400 can more easily install the marker 110 used for the position and the posture of the imaging camera 200, and can prevent the marker 110 from being reflected in the imaging camera 200.

2. Operation Example

Figure 4:
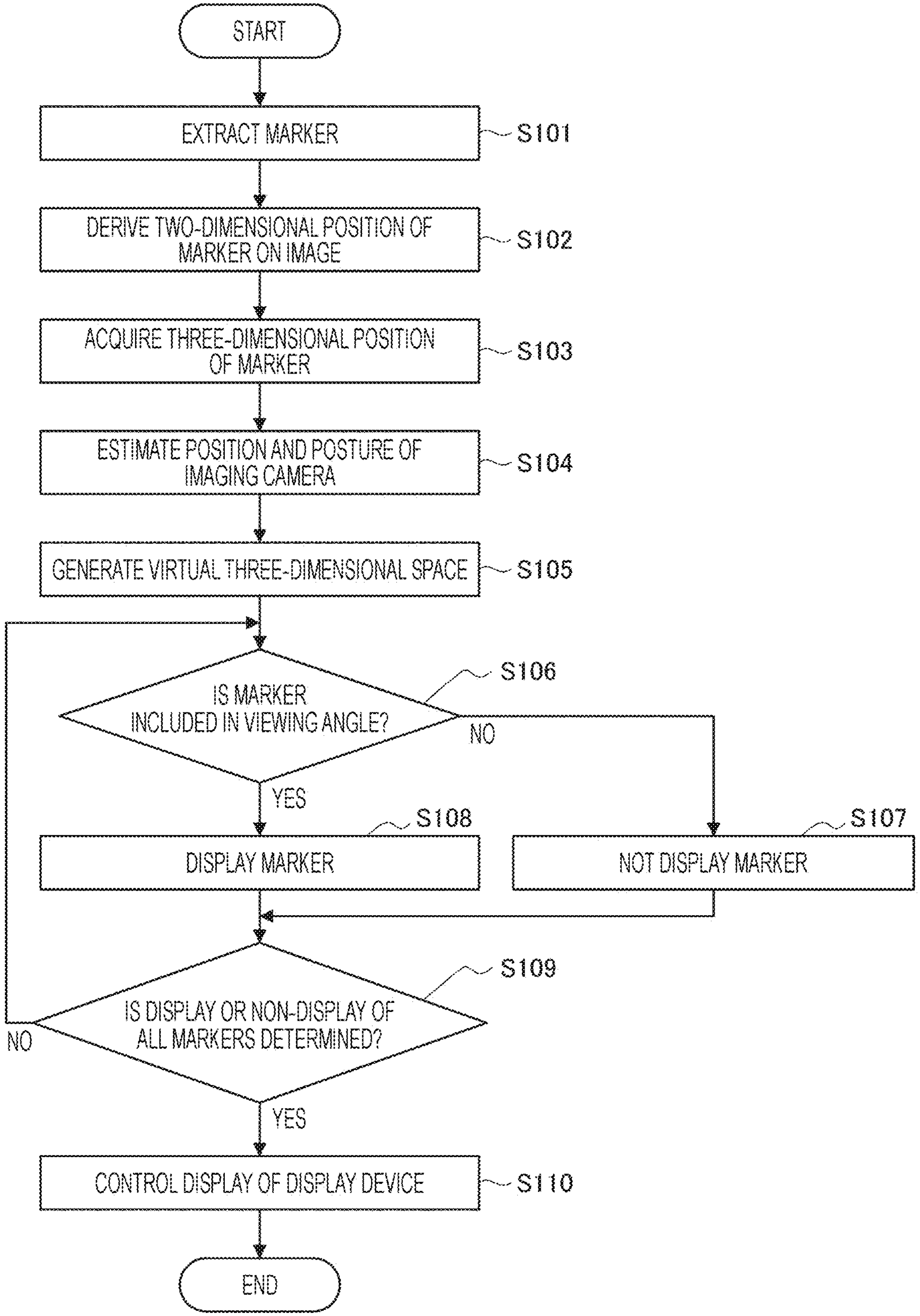
FIG. 4 is a flowchart illustrating a flow of an operation example of the information processing apparatus according to the embodiment.

An operation example of the information processing apparatus 400 according to the present embodiment will be described with reference to FIG. 4. FIG. 4 is a flowchart illustrating a flow of the operation example of the information processing apparatus 400 according to the present embodiment.

As illustrated in FIG. 4, first, the marker extraction unit 410 extracts the marker 110 from the captured image of the marker 110 by the tracking camera 300 (S101), and derives the two-dimensional position of the marker 110 (S102).

Next, the three-dimensional position acquisition unit 420 acquires the three-dimensional position of the marker 110 (S103). The three-dimensional position acquisition unit 420 may acquire the three-dimensional position of the marker 110 stored in advance, or may derive the three-dimensional position of the marker 110 using various information.

Subsequently, the position estimation unit 430 estimates the position and the posture of the imaging camera 200 (S104). Specifically, the position estimation unit 430 first estimates the position and the posture of the tracking camera 300 on the basis of the correspondence relationship between the two-dimensional position of the marker 110 and the three-dimensional position of the marker 110 in the captured image. Thereafter, the position estimation unit 430 may estimate the position and the posture of the imaging camera 200 by adjusting offsets of the position and the posture of the tracking camera 300 and the position and the posture of the imaging camera 200.

Next, the image generation unit 440 generates a virtual three-dimensional space displayed on the display device 100 by computer graphics (S105).

Here, the marker control unit 450 determines whether or not the marker 110 is included in the viewing angle of the imaging camera 200 derived from the position and the posture of the imaging camera 200 for each of the markers 110 (S106). In a case where the marker 110 is included within the viewing angle of the imaging camera 200 (S106/Yes), the marker control unit 450 controls such that the marker 110 is not displayed (S107). On the other hand, in a case where the marker 110 is not included in the viewing angle of the imaging camera 200 (S106/No), the marker control unit 450 performs control such that the marker 110 is displayed (S108). The marker control unit 450 performs the above-described display or non-display control for each of the markers 110.

Thereafter, the marker control unit 450 determines whether or not display or non-display of all the markers 110 is controlled (S109). In a case where the display or non-display of all the markers 110 is not controlled (S109/No), the marker control unit 450 executes the control of steps S106 to S108 for the markers 110 whose display or non-display is not controlled.

In a case where the display or non-display of all the markers 110 is controlled (S109/Yes), the display control unit 460 controls the image displayed on the display device 100 (S110). Specifically, the display control unit 460 causes the display device 100 within the viewing angle of the imaging camera 200 to visually recognize a virtual three-dimensional space from a viewpoint corresponding to the position and the posture of the imaging camera 200 and display an image in which the marker 110 is controlled to be non-displayed. In addition, the display control unit 460 causes the display device 100 outside the viewing angle of the imaging camera 200 to visually recognize a virtual three-dimensional space from a predetermined fixed viewpoint and display an image controlled to display the marker 110.

According to the above operation, the information processing apparatus 400 can control display or non-display of the marker 110 embedded in the display device 100 on the basis of the viewing angle of the imaging camera 200 estimated from the position and the posture of the imaging camera 200.

3. Modifications

3.1. First Modification

Figure 5:
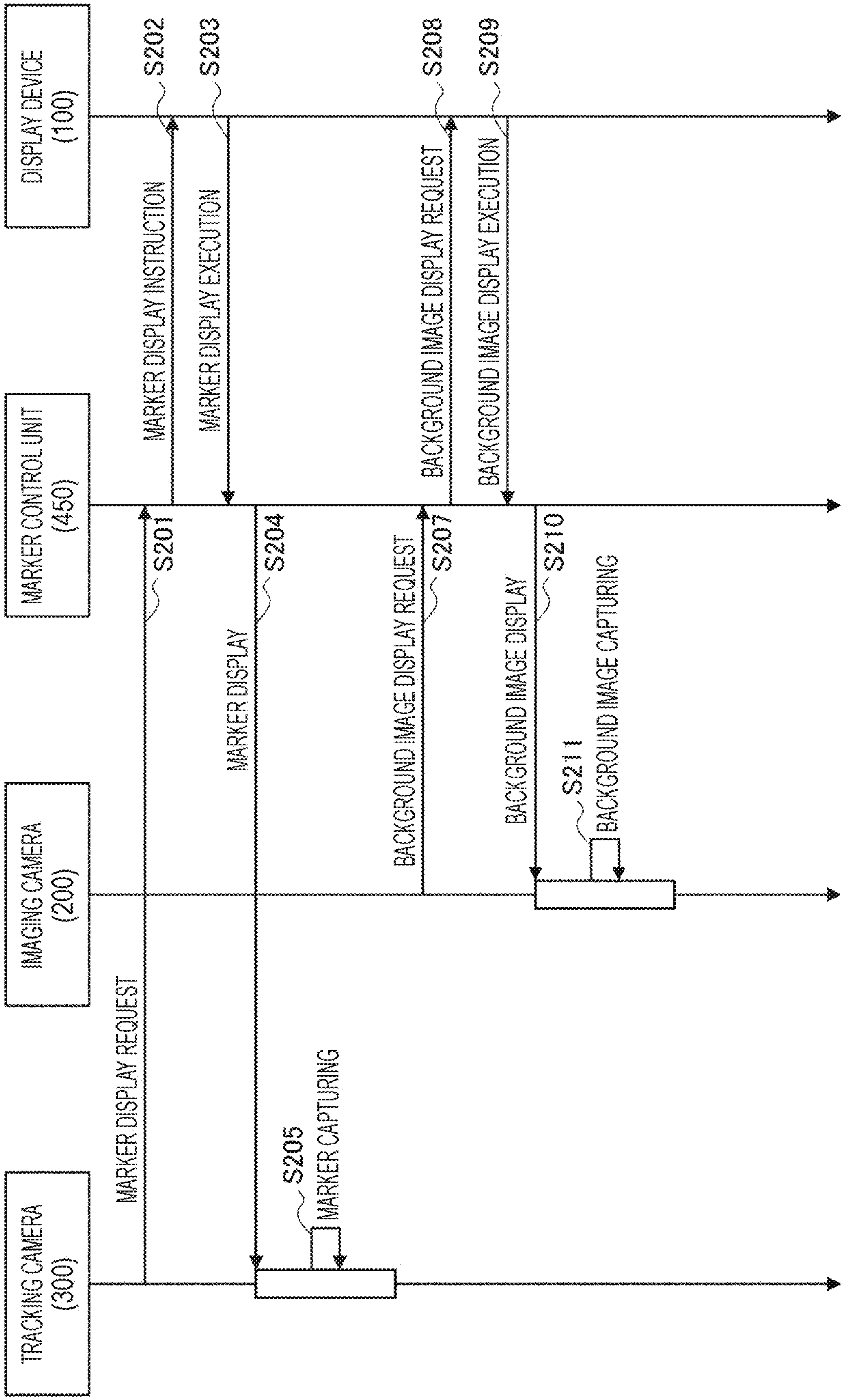
FIG. 5 is a sequence diagram illustrating a flow of an operation example of an information processing system according to a first modification.

A first modification of the information processing system 1 according to the present embodiment will be described with reference to FIG. 5. FIG. 5 is a sequence diagram illustrating a flow of an operation example of the information processing system 1 according to the first modification. In the first modification, the information processing system 1 can prevent the marker 110 from being reflected in the captured image of the imaging camera 200 by switching the display of the marker 110 and the display of the image of the virtual three-dimensional space serving as the background of the scene for each frame time-divided in the display device 100.

As illustrated in FIG. 5, for example, in a predetermined frame, the tracking camera 300 outputs a marker display request for causing the marker control unit 450 to display the marker 110 (S201). As a result, the marker control unit 450 outputs a marker display instruction for displaying the marker 110 on the display device 100 (S202), and the display device 100 displays the marker 110 (S203, S204). Thereafter, the tracking camera 300 captures an image of the marker 110 displayed on the display device 100 (S205).

Subsequently, in the next frame, the imaging camera 200 outputs a background image display request for causing the marker control unit 450 to display a background image (S207). As a result, the marker control unit 450 outputs a background image display instruction for causing the marker 110 to be non-displayed and causing the background image to be displayed on the display device 100 (S208), and the display device 100 displays the background image after not displaying the marker 110 (S209, S210). Thereafter, the imaging camera 200 images a background image serving as a background of the scene displayed on the display device 100 (S211).

Further, in the next frame in which the background image is imaged by the imaging camera 200, the capturing of the marker 110 by the tracking camera 300 (S201 to S205) is executed again. By repeating these operations, the information processing system 1 according to the first modification can simultaneously perform capturing of the marker 110 for estimating the position and the posture of the imaging camera 200 and imaging of a virtual three-dimensional space serving as a background of a scene in parallel.

In the information processing system 1 according to the first modification, capturing of the marker 110 by the tracking camera 300 and imaging of an image of a virtual three-dimensional space by the imaging camera 200 are alternately executed for each time-divided frame. That is, in the information processing system 1 according to the first modification, since imaging by the imaging camera 200 is not performed when the marker 110 is displayed, even in a case where the marker 110 is displayed within the viewing angle of the imaging camera 200, it is possible to prevent the marker 110 from being reflected in the captured image of the imaging camera 200.

3.2. Second Modification

Figure 6:
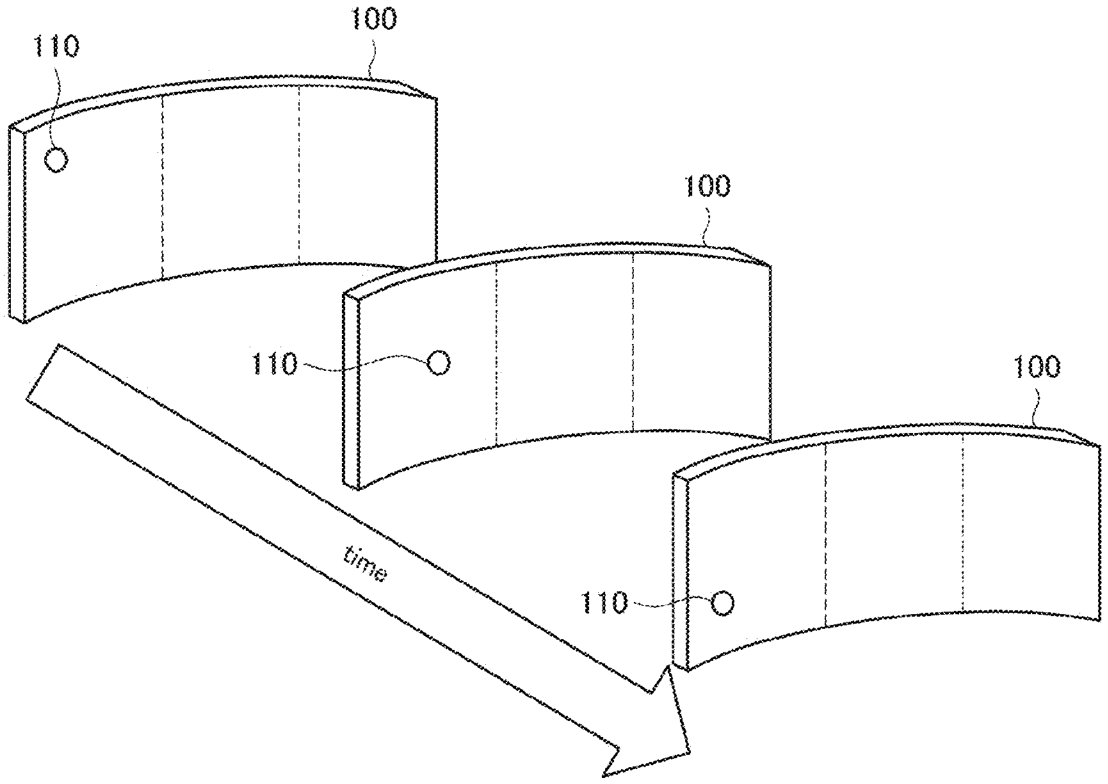
FIG. 6 is an explanatory diagram illustrating display or non-display of a marker in time series in an information processing system according to a second 10 modification.

A second modification of the information processing system 1 according to the present embodiment will be described with reference to FIG. 6. FIG. 6 is an explanatory diagram illustrating display or non-display of the marker 110 in time series in the information processing system 1 according to the second modification. In the second modification, the information processing system 1 can more easily identify each of the markers 110 by changing the display or non-display pattern of each of the markers 110 for each time-divided frame.

As illustrated in FIG. 6, for example, the marker control unit 450 may control display or non-display of each of the markers 110 such that a displayed or non-displayed pattern is different for each of the markers 110 for each time-divided capturing frame. For example, the marker control unit 450 may control the display or non-display of each of the markers 110 such that the display or non-display of each of the markers 110 becomes a unique pattern in time series.

In such a case, the position estimation unit 430 can more easily identify each of the markers 110 on the basis of the unique time-series pattern of the display or non-display of the marker 110. Therefore, since the position estimation unit 430 can identify each of the markers 110 in the captured image captured by the tracking camera 300, the correspondence relationship between the two-dimensional position of the marker 110 and the three-dimensional position of the marker 110 can be more easily determined.

3.3. Third Modification

Figure 7:
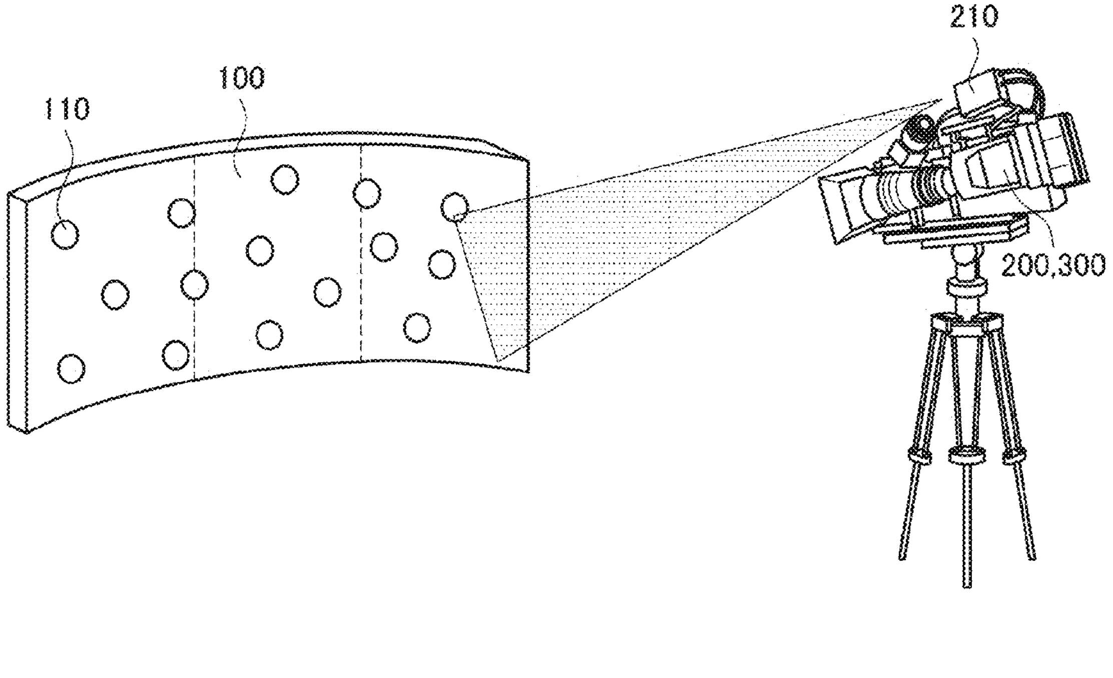
FIG. 7 is an explanatory diagram illustrating a method of estimating a three-dimensional position of a marker in an information processing system according to a third modification.
Figure 8:
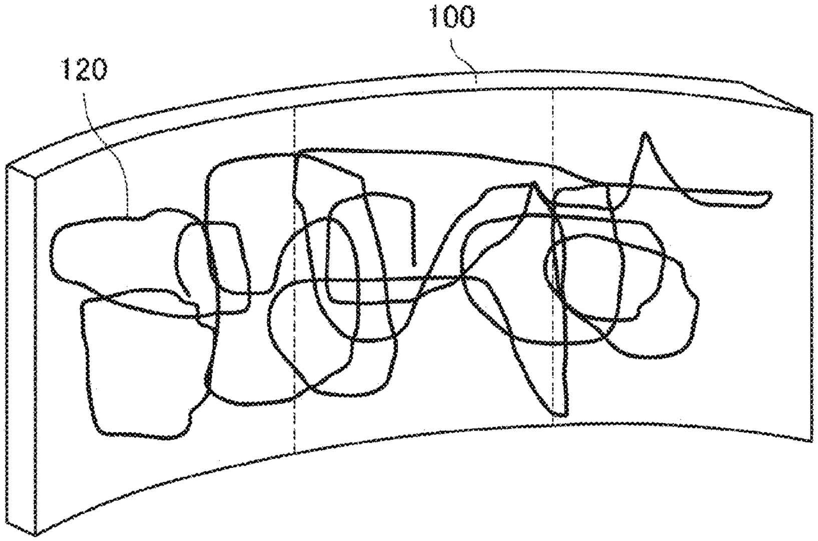
FIG. 8 is an explanatory diagram illustrating a method of estimating a three-dimensional position of a marker in the information processing system according to the third modification.

A third modification of the information processing system 1 according to the present embodiment will be described with reference to FIGS. 7 and 8. FIGS. 7 and 8 are explanatory diagrams illustrating a method of estimating the three-dimensional position of the marker 110 in the information processing system 1 according to the third modification. In the third modification, the information processing system 1 can derive the three-dimensional position of the marker 110 by further using information regarding the distance to the display device 100 or the shape of the display device 100.

As illustrated in FIG. 7, the imaging camera 200 and the tracking camera 300 may be further provided with a distance measurement device 210. The distance measurement device 210 is, for example, a time of flight (ToF) sensor, and can measure the distance to the marker 110 embedded in the display device 100. In such a case, the three-dimensional position acquisition unit 420 can acquire the three-dimensional position of the marker 110 by using the two-dimensional position of the marker 110 on the display surface of the display device 100 and the information regarding the distance (depth) from the distance measurement device 210 to the marker 110.

Furthermore, as illustrated in FIG. 8, the information processing system 1 may measure the shape of the display surface of the display device 100 by displaying a predetermined two-dimensional pattern 120 on the display surface of the display device 100 and capturing the displayed two-dimensional pattern 120. Specifically, in a case where the two-dimensional pattern 120 is displayed or projected on a display surface having irregularities, distortion occurs in the displayed or projected two-dimensional pattern 120 according to the irregularities of the display surface. Therefore, the three-dimensional position acquisition unit 420 can measure the shape of the display surface of the display device 100 by detecting the distortion of the displayed or projected two-dimensional pattern 120. Therefore, the three-dimensional position acquisition unit 420 can acquire the three-dimensional position of the marker 110 by using the two-dimensional position of the marker 110 on the display surface of the display device 100 and the shape of the display surface of the display device 100.

Note that, as the two-dimensional pattern, any pattern having a two-dimensional spread can be used. However, in order to measure the shape of the display surface of the display device 100 with higher accuracy, the two-dimensional pattern is preferably a denser and more complicated pattern.

3.4. Fourth Modification

A fourth modification of the information processing system 1 according to the present embodiment will be described. In the fourth modification, the information processing system 1 can estimate the position and the posture of the imaging camera 200 by the position estimation unit 430 by extracting the feature point of the image displayed on the display device 100 as the marker 110.

Specifically, the marker extraction unit 410 may recognize a feature point (for example, a corner or a ridgeline of an outer shape of an object, or the like) of the object appearing in the image of the fixed viewpoint displayed on the display device 100 outside the viewing angle of the imaging camera 200, and extract the recognized feature point as the marker 110. In such a case, the position estimation unit 430 can estimate the position and the posture of the imaging camera 200 from the feature point of the image displayed on the display device 100 outside the viewing angle of the imaging camera 200.

Furthermore, the image displayed on the display device 100 outside the viewing angle of the imaging camera 200 may be moving. The movement of the image displayed on the display device 100 outside the viewing angle of the imaging camera 200 can be grasped by the image generation unit 440 or the display control unit 460. Therefore, by correcting the movement of the image displayed on the display device 100, the position estimation unit 430 can estimate the position and the posture of the imaging camera 200 from the feature point of the image similarly to the image of the fixed viewpoint.

Furthermore, the position estimation unit 430 may perform visual simultaneous localization and mapping (SLAM) on a virtual three-dimensional space by an image displayed on the display device 100, thereby performing map creation and self-position estimation of the virtual three-dimensional space. According to this, the position estimation unit 430 can directly estimate the self-position of the imaging camera 200 in the virtual three-dimensional space. In such a case, the viewpoint of the image displayed on the display device 100 is preferably changed following the change in the position and the posture of the imaging camera 200 regardless of the inside or outside of the viewing angle of the imaging camera 200.

Here, in a case where the feature point of the image displayed on the display device 100 is used as the marker 110, it is important to separate the foreground of the performer 2, the moving object, the stage tool, or the like from the image captured by the tracking camera 300 and extract only the background image displayed on the display device 100.

For example, the marker extraction unit 410 can separate the foreground of the performer 2 or the like from the image captured by the tracking camera 300 by taking a difference between the image output to the display device 100 and the image actually captured by the tracking camera 300.

Furthermore, as described in the third modification, in a case where the information regarding the distance (depth) to the display device 100 is known by the distance measurement device 210, the marker extraction unit 410 can separate an object existing in front of the display device 100 as the foreground. Furthermore, in a case where the shape of the display surface of the display device 100 is known, the marker extraction unit 410 can separate an object existing in front of the display surface of the display device 100 as the foreground.

3.5. Fifth Modification

Figure 9:
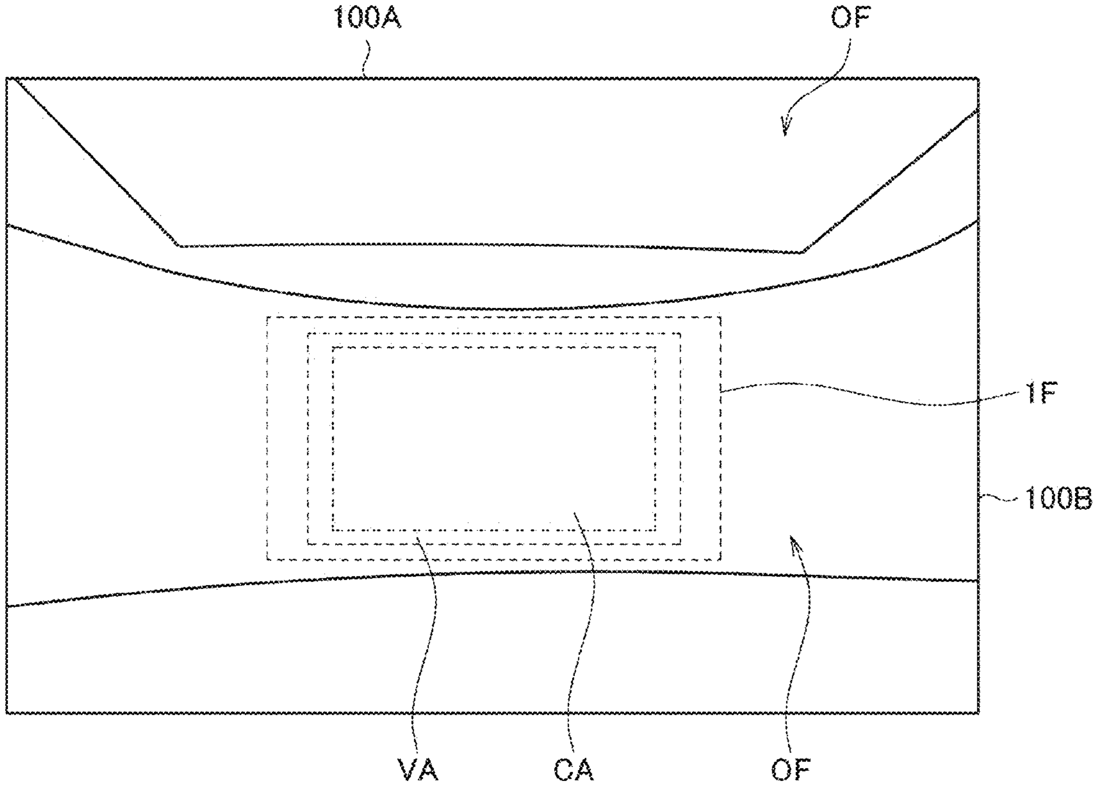
FIG. 9 is an explanatory diagram illustrating each area of a display device in an information processing system according to a fifth modification.

A fifth modification of the information processing system 1 according to the present embodiment will be described with reference to FIG. 9. FIG. 9 is an explanatory diagram illustrating each area of the display device 100 in the information processing system 1 according to the fifth modification. In the fifth modification, the information processing system 1 can control display or non-display of the marker 110 on the basis of whether or not the marker 110 is included in the area set on the basis of the viewing angle of the imaging camera 200.

As illustrated in FIG. 9, on the display surface of the display device 100 (the display device 100B in FIG. 9), an inner frustum IF is set outside a viewing angle VA of the imaging camera 200, and a content area CA is set inside a viewing angle VA of the imaging camera 200. Furthermore, an area of the display surface outside the inner frustum IF is referred to as an outer frustum OF. Note that, in the display device 100A in which the inner frustum IF is not set, the entire surface of the display surface is the outer frustum OF.

The inner frustum IF is, for example, an area obtained by enlarging the viewing angle VA of the imaging camera 200 outward by a predetermined width (for example, about several tens of centimeters). The inner frustum IF is an area in which an image whose viewpoint changes following changes in the position and the posture of the imaging camera 200 is displayed in order to reproduce the viewpoint of the imaging camera 200 in a virtual three-dimensional space. On the other hand, the outer frustum OF on the outer side of the inner frustum IF is an area in which an image of a fixed viewpoint of a three-dimensional space that provides ambient light of a virtual three-dimensional space is displayed. The content area CA is an area inside the viewing angle VA of the imaging camera 200 by a predetermined width (for example, about several tens of centimeters). An image in the content area CA of the image captured by the imaging camera 200 is used for the actual video content.

In the fifth modification, the information processing system 1 may control display or non-display of the marker 110 existing on the display surface of the display device 100 on the basis of whether or not the marker 110 is included in the inner frustum IF instead of the viewing angle VA. Specifically, the information processing system 1 may perform control such that the marker 110 included in the inner frustum IF is not displayed, and the marker 110 not included in the inner frustum IF (that is, included in the outer frustum OF) is displayed. In such a case, the information processing system 1 can more reliably prevent the marker 110 from being reflected in the imaging camera 200 by controlling the display or non-display of the marker 110 with the inner frustum IF wider than the viewing angle VA as a reference.

Furthermore, the information processing system 1 may control display or non-display of the marker 110 existing on the display surface of the display device 100 on the basis of whether or not the marker 110 is included in the content area CA instead of the viewing angle VA. Specifically, the information processing system 1 may perform control such that the marker 110 included in the content area CA is not displayed and the marker 110 not included in the content area CA is displayed. In such a case, the information processing system 1 can estimate the position and the posture of the imaging camera 200 without using the tracking camera 300 by capturing the marker 110 existing in the area outside the content area CA in the viewing angle VA with the imaging camera 200. Furthermore, the information processing system 1 can prevent the marker 110 from being reflected in the image actually used for the video content by not displaying the marker 110 included in the content area CA.

4. Hardware

Figure 10:
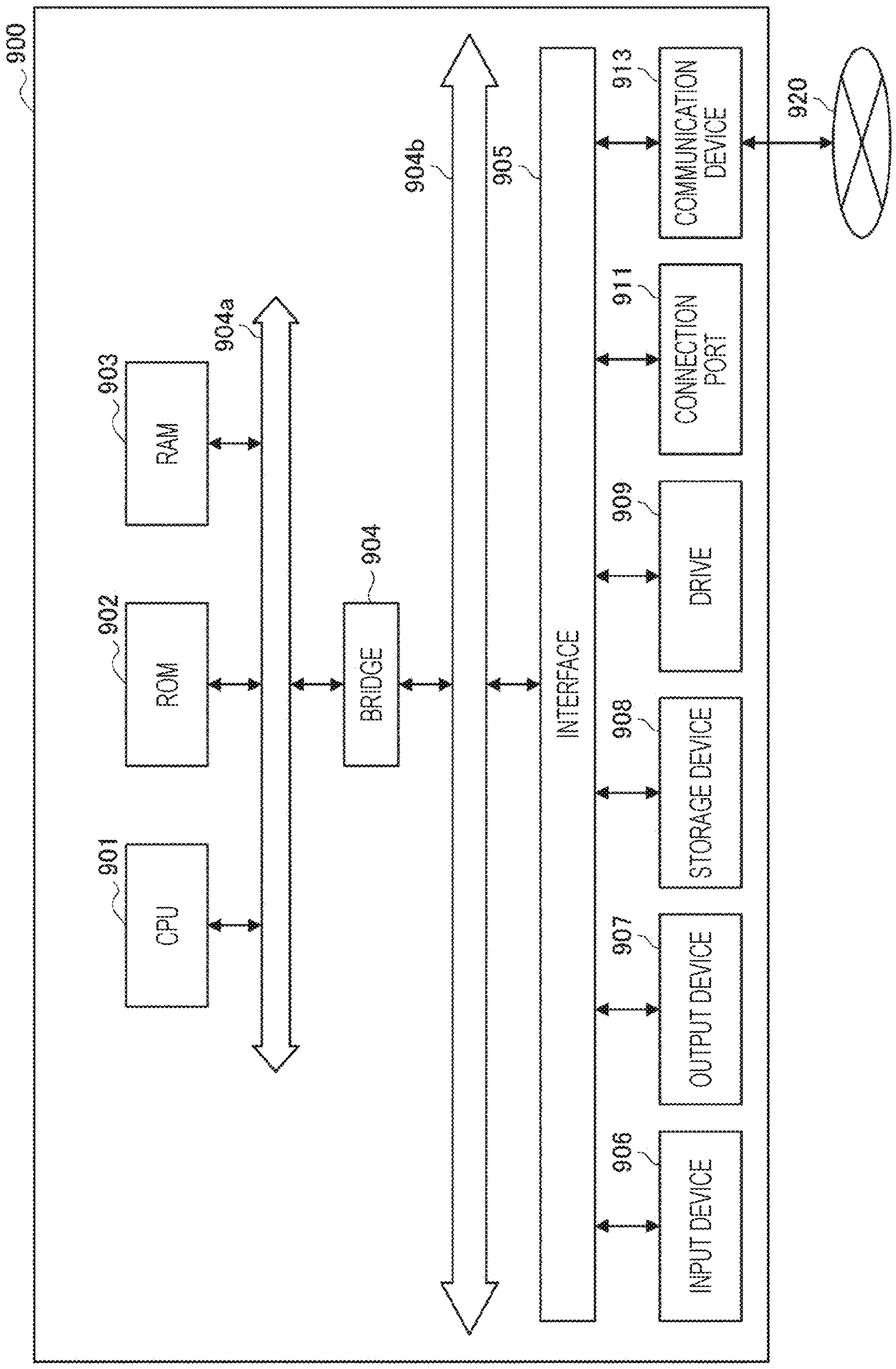
FIG. 10 is a block diagram illustrating a configuration example of a computer device which is hardware of the information processing apparatus according to the embodiment.

Hardware of the information processing apparatus 400 according to the present embodiment will be described with reference to FIG. 10. FIG. 10 is a block diagram illustrating a configuration example of a computer device 900 which is hardware of the information processing apparatus 400 according to the present embodiment.

The function of the information processing apparatus 400 according to the present embodiment can be realized by cooperation of software and hardware (computer device 900) described below. For example, the functions of the marker extraction unit 410, the three-dimensional position acquisition unit 420, the position estimation unit 430, the image generation unit 440, the marker control unit 450, and the display control unit 460 may be executed by, for example, the CPU 901.

As illustrated in FIG. 10, the computer device 900 includes a central processing unit (CPU) 901, a read only memory (ROM) 902, and a random access memory (RAM) 903.

Furthermore, the computer device 900 may further include a host bus 904*a*, a bridge 904, an external bus 904*b*, an interface 905, an input device 906, an output device 907, a storage device 908, a drive 909, a connection port 911, or a communication device 913. Furthermore, the computer device 900 may include a processing circuit such as a digital signal processor (DSP) or an application specific integrated circuit (ASIC) instead of the CPU 901 or together with the CPU 901.

The CPU 901 functions as an arithmetic processing device or a control device, and controls an operation in the computer device 900 according to various programs recorded on a removable recording medium mounted on the ROM 902, the RAM 903, the storage device 908, or the drive 909. The ROM 902 stores programs, calculation parameters, and the like used by the CPU 901. The RAM 903 temporarily stores a program used in execution by the CPU 901, and parameters used during the execution, and the like.

The CPU 901, the ROM 902, and the RAM 903 are mutually connected by the host bus 904*a* capable of high-speed data transmission. The host bus 904*a* is connected to the external bus 904*b* such as a peripheral component interconnect/interface (PCI) bus via the bridge 904, and the external bus 904*b* is connected to various components via the interface 905.

The input device 906 is, for example, a device that receives an input from a user, such as a mouse, a keyboard, a touch panel, a button, a switch, or a lever. Note that, the input device 906 may be a microphone or the like that detects voice of the user. The input device 906 may be, for example, a remote control device using infrared rays or other radio waves, or may be an external connection device compatible with the operation of the computer device 900.

The input device 906 further includes an input control circuit that outputs an input signal generated on the basis of information input by the user to the CPU 901. The user can input various data or instruct a processing operation to the computer device 900 by operating the input device 906.

The output device 907 is a device capable of visually or aurally presenting information acquired or generated by the computer device 900 to the user. The output device 907 may be, for example, a display device such as a liquid crystal display (LCD), a plasma display panel (PDP), an organic light emitting diode (OLED) display, a hologram, or a projector, a sound output device such as a speaker or a headphone, or a printing device such as a printer device. The output device 907 can output information obtained by the processing of the computer device 900 as a video such as a text or an image, or a sound such as voice or audio.

The storage device 908 is a data storage device configured as an example of a storage unit of the computer device 900. The storage device 908 may include, for example, a magnetic storage device such as a hard disk drive (HDD), a semiconductor storage device, an optical storage device, a magneto-optical storage device, or the like. The storage device 908 can store programs executed by the CPU 901, various data, various data acquired from the outside, or the like.

The drive 909 is a reading or writing device for a removable recording medium such as a magnetic disk, an optical disk, a magneto-optical disk, or a semiconductor memory, and is built in or externally attached to the computer device 900. For example, the drive 909 can read information recorded in the attached removable recording medium and output the information to the RAM 903. Furthermore, the drive 909 can write a record in the attached removable recording medium.

The connection port 911 is a port for directly connecting an external connection device to the computer device 900. The connection port 911 may be, for example, a universal serial bus (USB) port, an IEEE 1394 port, a small computer system interface (SCSI) port, or the like. Furthermore, the connection port 911 may be an RS-232C port, an optical audio terminal, or a high-definition multimedia interface (HDMI (registered trademark)) port, or the like. The connection port 911 is connected to an external connection device, so that various data can be transmitted and received between the computer device 900 and the external connection device.

The communication device 913 is, for example, a communication interface including a communication device or the like for connecting to the communication network 920. The communication device 913 may be, for example, a communication card for wired or wireless local area network (LAN), Wi-Fi (registered trademark), Bluetooth (registered trademark), or wireless USB (WUSB). Furthermore, the communication device 913 may be a router for optical communication, a router for asymmetric digital subscriber line (ADSL), a modem for various kinds of communication, or the like.

For example, the communication device 913 can transmit and receive signals and the like to and from the Internet or another communication device by using a predetermined protocol such as TCP/IP. Furthermore, the communication network 920 connected to the communication device 913 is a network connected by wire or wirelessly, and may be, for example, an Internet communication network, a home LAN, an infrared communication network, a radio wave communication network, a satellite communication network, or the like.

Note that it is also possible to create a program for causing the computer device 900 including the CPU 901, the ROM 902, the RAM 903, and the like built in the computer to exhibit functions equivalent to those of the information processing apparatus 400 described above. Furthermore, a computer-readable recording medium in which the program is recorded can also be provided.

While the preferred embodiment of the present disclosure has been described above in detail with reference to the drawings, the technical scope of the present disclosure is not limited thereto. It is apparent that a person having ordinary knowledge in the technical field of the present disclosure can achieve various variation examples or modification examples within the scope of the technical idea recited in claims, and it will be naturally understood that they also belong to the technical scope of the present disclosure.

Furthermore, the effects described in the present specification are merely exemplary or illustrative, and are not restrictive. That is, the technology according to the present disclosure may exert other effects apparent to those skilled in the art from the description of the present specification in addition to or instead of the effects described above.

Note that the following configurations also fall within the technical scope of the present disclosure.

(1)

An information processing apparatus including:

a position estimation unit configured to estimate a position and a posture of an imaging camera configured to image an image displayed on a display device as a background by using a plurality of markers existing on a display surface of the display device; and a marker control unit configured to control display or non-display of each of the markers on the basis of a viewing angle of the imaging camera determined from the position and the posture of the imaging camera.

(2)

The information processing apparatus according to (1), in which the marker control unit performs control such that the marker within the viewing angle is not displayed and the marker outside the viewing angle is displayed.

(3)

The information processing apparatus according to (1), in which the marker control unit performs control such that the marker in an inner frustum set in an area including the viewing angle on the basis of the viewing angle is not displayed and the marker outside the inner frustum is displayed.

(4)

The information processing apparatus according to (1), in which the marker control unit performs control such that, among time-divided frames of the image displayed on the display device, the marker is not displayed in the frame captured by the imaging camera, and the marker is displayed in the frame not captured by the imaging camera.

(5)

The information processing apparatus according to any one of (1) to (4), in which the marker control unit controls a size of the marker according to a distance from the imaging camera to the marker.

(6)

The information processing apparatus according to any one of (1) to (5), in which the marker control unit controls a hue of the marker according to a hue of an image displayed on the display surface on which the marker exists.

(7)

The information processing apparatus according to any one of (1) to (6), in which the marker exists on the display surface in a distribution based on a curvature of the display surface of the display device.

(8)

The information processing apparatus according to any one of (1) to (7), in which the marker is an image displayed on the display surface of the display device.

(9)

The information processing apparatus according to (8), in which the marker is a feature point of a mark, a two-dimensional code, a texture, or an image displayed on the display surface.

(10)

The information processing apparatus according to (9), in which the feature point is a feature point extracted from an image existing outside the viewing angle in the image displayed on the display device.

(11)

The information processing apparatus according to any one of (1) to (7), in which the marker is a pixel embedded in the display surface of the display device.

(12)

The information processing apparatus according to any one of (1) to (11), in which the marker exists in an aperiodic distribution on the display surface.

(13)

The information processing apparatus according to any one of (1) to (12), in which the image displayed on the display device is controlled according to a position and a posture of the imaging camera.

(14)

The information processing apparatus according to any one of (1) to (13), in which the display device is provided at each of a plurality of positions in an environment where the imaging camera is installed, and the marker exists on a display surface of a display device configured to display an image of a fixed viewpoint among a plurality of the display devices.

(15)

The information processing apparatus according to (14), in which the display device configured to display the image of the fixed viewpoint is provided at least on a ceiling of the environment.

(16)

The information processing apparatus according to any one of (1) to (15), in which the position estimation unit estimates a position and a posture of the imaging camera on the basis of a distribution image of the plurality of markers captured by a tracking camera provided integrally with the imaging camera.

(17)

The information processing apparatus according to (16), in which the position estimation unit estimates a position and a posture of the imaging camera on the basis of a two-dimensional position of the marker in a distribution image of the plurality of markers captured by the tracking camera and a three-dimensional position of the marker.

(18)

The information processing apparatus according to (17), in which the three-dimensional position of the marker is derived on the basis of information regarding a shape of the display surface of the display device and information indicating a position of the marker on the display surface.

(19)

The information processing apparatus according to (17), in which the three-dimensional position of the marker is derived on the basis of information indicating a distance to the marker measured by a distance measurement device provided in the tracking camera and a distribution image of the marker.

(20)

The information processing apparatus according to any one of (16) to (19), in which the viewing angle of the imaging camera and a viewing angle of the tracking camera are different from each other.

(21)

An information processing system including:

the information processing apparatus according to claim 1;

the display device in which the plurality of markers exists on the display surface;

the imaging camera configured to image an image displayed on the display device as a background; and a tracking camera that is provided integrally with the imaging camera and captures images of the plurality of markers.

(22)

An information processing method including:

by an arithmetic processing device, estimating a position and a posture of an imaging camera configured to image an image displayed on a display device as a background by using a plurality of markers existing on a display surface of the display device; and controlling display or non-display of each of the markers on the basis of a viewing angle of the imaging camera determined from the position and the posture of the imaging camera.

(23)

A program configured to cause a computer to function as:

a position estimation unit configured to estimate a position and a posture of an imaging camera configured to image an image displayed on a display device as a background by using a plurality of markers existing on a display surface of the display device; and a marker control unit configured to control display or non-display of each of the markers on the basis of a viewing angle of the imaging camera determined from the position and the posture of the imaging camera.

REFERENCE SIGNS LIST

1 Information processing system
2 Performer
100 Display device
110 Marker
120 Two-dimensional pattern
200 Imaging camera
210 Distance measurement device
300 Tracking camera
400 Information processing apparatus
410 Marker extraction unit
420 Three-dimensional position acquisition unit
430 Position estimation unit
440 Image generation unit
450 Marker control unit
460 Display control unit

The invention claimed is:

1. An information processing apparatus comprising:

circuitry configured to estimate a position and a posture of an imaging camera configured to image an image displayed on a display device as a background by using a plurality of markers existing on a display surface of the display device, and control whether to display each of the markers based on a viewing angle of the imaging camera determined from the position and the posture of the imaging camera, wherein the circuitry performs the control such that each marker of the plurality of markers located within the viewing angle of the imaging camera is not displayed and each marker of the plurality of markers located outside the viewing angle of the imaging camera is displayed, and wherein a position of each marker is determined according to one or more tracking images capturing the display device with a viewing angle different from the viewing angle of the imaging camera.

2. The information processing apparatus according to claim 1, wherein the circuitry performs control such that each marker in an inner frustum set in an area including the viewing angle of the imaging camera is not displayed and each marker outside the inner frustum is displayed.

3. The information processing apparatus according to claim 1, wherein the circuitry performs control such that, among time-divided frames of the image displayed on the display device, the marker is not displayed in the frame captured by the imaging camera, and the marker is displayed in the frame not captured by the imaging camera.

4. The information processing apparatus according to claim 1, wherein the circuitry controls a size of the marker according to a distance from the imaging camera to the marker.

5. The information processing apparatus according to claim 1, wherein the circuitry controls a hue of the marker according to a hue of an image displayed on the display surface on which the marker exists.

6. The information processing apparatus according to claim 1, wherein the marker exists on the display surface in a distribution based on a curvature of the display surface of the display device.

7. The information processing apparatus according to claim 1, wherein the marker is an image displayed on the display surface of the display device.

8. The information processing apparatus according to claim 7, wherein the marker is a feature point of a mark, a two-dimensional code, a texture, or an image displayed on the display surface.

9. The information processing apparatus according to claim 8, wherein the feature point is a feature point extracted from an image existing outside the viewing angle of the imaging camera in the image displayed on the display device.

10. The information processing apparatus according to claim 1, wherein the marker is a pixel embedded in the display surface of the display device.

11. The information processing apparatus according to claim 1, wherein the marker exists in an aperiodic distribution on the display surface.

12. The information processing apparatus according to claim 1, wherein the image displayed on the display device is controlled according to a position and a posture of the imaging camera.

13. The information processing apparatus according to claim 1, wherein the display device is provided at each of a plurality of positions in an environment where the imaging camera is installed, and wherein the marker exists on a display surface of a display device configured to display an image of a fixed viewpoint among a plurality of the display devices.

14. The information processing apparatus according to claim 13, wherein the display device configured to display the image of the fixed viewpoint is provided at least on a ceiling of the environment.

15. The information processing apparatus according to claim 1, wherein the circuitry estimates a position and a posture of the imaging camera based on a distribution image of the plurality of markers captured by a tracking camera provided integrally with the imaging camera.

16. The information processing apparatus according to claim 15, wherein the circuitry estimates a position and a posture of the imaging camera based on a two-dimensional position of the marker in a distribution image of the plurality of markers captured by the tracking camera and a three-dimensional position of the marker.

17. The information processing apparatus according to claim 16, wherein the three-dimensional position of the marker is derived based on information regarding a shape of the display surface of the display device and information indicating a position of the marker on the display surface.

18. The information processing apparatus according to claim 16, wherein the three-dimensional position of the marker is derived based on information indicating a distance to the marker measured by a distance measurement device provided in the tracking camera and a distribution image of the marker.

19. The information processing apparatus according to claim 15, wherein the viewing angle of the imaging camera and a viewing angle of the tracking camera are different from each other.

20. An information processing system comprising:

the information processing apparatus according to claim 1;

the display device in which the plurality of markers exists on the display surface;

the imaging camera configured to image an image displayed on the display device as a background; and a tracking camera that is provided integrally with the imaging camera and captures the one or more tracking images of the plurality of markers.

21. An information processing method, executed by at least one processor, the method comprising:

estimating a position and a posture of an imaging camera configured to image an image displayed on a display device as a background by using a plurality of markers existing on a display surface of the display device; and controlling whether to display each of the markers based on a viewing angle of the imaging camera determined from the position and the posture of the imaging camera, wherein the control is performed such that each marker of the plurality of markers located within the viewing angle of the imaging camera is not displayed and each marker of the plurality of markers located outside the viewing angle of the imaging camera is displayed, and wherein a position of each marker is determined according to one or more tracking images capturing the display device with a viewing angle different from the viewing angle of the imaging camera.

22. A non-transitory computer-readable storage medium having embodied thereon a program, which when executed by a computer causes the computer to execute a method, the method comprising:

estimating a position and a posture of an imaging camera configured to image an image displayed on a display device as a background by using a plurality of markers existing on a display surface of the display device; and controlling whether to display each of the markers based on a viewing angle of the imaging camera determined from the position and the posture of the imaging camera, wherein the control is performed such that each marker of the plurality of markers located within the viewing angle of the imaging camera is not displayed and each marker of the plurality of markers located outside the viewing angle of the imaging camera is displayed, and wherein a position of each marker is determined according to one or more tracking images capturing the display device with a viewing angle different from the viewing angle of the imaging camera.

* * * * *